CANOPY CONSTRUCTION

Original Filed Sept. 5, 1947 2 Sheets-Sheet 1

INVENTORS
Samuel B. Korman and
Meyer Harrison
BY Christy, Parmelee & Stickland
ATTORNEYS.

INVENTORS
Samuel B. Korman and
Meyer Harrison
BY Christy, Parmelee & Strickland
ATTORNEYS.

Reissued Nov. 10, 1953

Re. 23,734

UNITED STATES PATENT OFFICE 23,734

CANOPY CONSTRUCTION

Samuel B. Korman and Meyer Harrison, Pittsburgh, Pa., assignors, by mesne assignments, to Koolvent Metal Awning Corporation of America, Pittsburgh, Pa., a corporation of Pennsylvania Original No. 2,585,256, dated February 12, 1952, Serial No. 772,302, September 5, 1947. Application for reissue December 2, 1952, Serial No. 323,738

8 Claims. (Cl. 20—57.5)

Matter enclosed in heavy brackets [ ] appears in the original patent but forms no part of this reissue specification; matter printed in italics indicates the additions made by reissue.

This invention is for a canopy construction for use over doorways, and relates particularly to a canopy formed of a plurality of louvre elements.

Our invention has for its object to provide an over-the-door canopy of novel, economical construction, which, however, is of good appearance, strong construction capable of withstanding high winds, but which is relatively light. It can be constructed in sheet metal shops without expensive equipment, and is relatively light and easily set up.

Our invention provides a canopy having a covering formed of overlapping alternately reversed louvres of channel section, preferably but not necessarily spaced to afford ventilation, and provide door-step protection from sun, rain and snow.

The invention may be more fully understood by reference to the accompanying drawing, in which.

Figure 1:
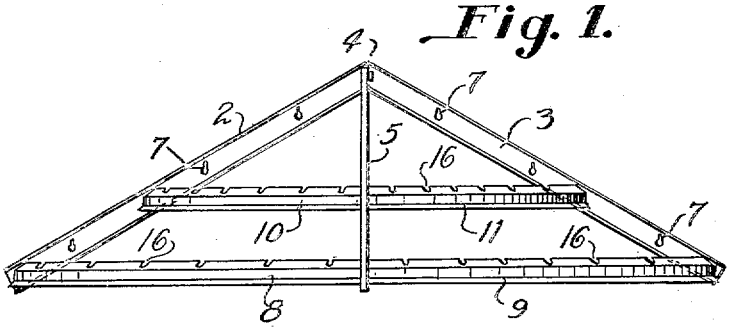
Fig. 1 is a front elevation of the canopy frame with the cover removed.
Figure 2:
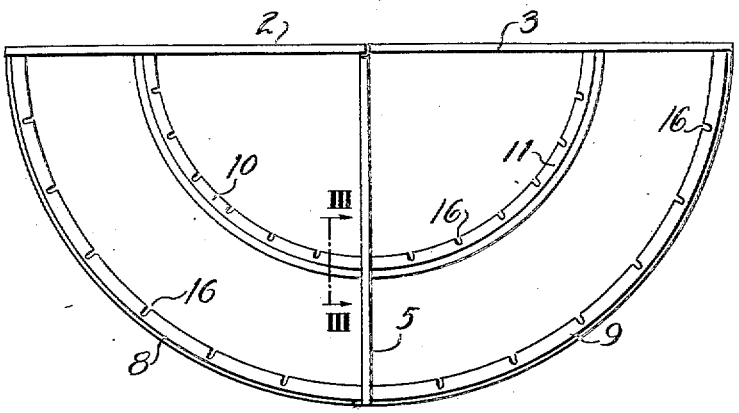
Fig. 2 is a top plan view thereof.

In the drawings, reference may first be made to Figs. 1 and 2, wherein it will be seen that the frame of the canopy is comprised of three sloping frame members converging to a central apex. Two of these members, 2 and 3, are of equal length, similar construction, and are in the same plane. They meet at the apex 4. The third member is in a plane at right angles to the first, sloping downwardly and forwardly from the apex. It has its upper end joined to the members 2 and 3 by angle cleats 6. All three frame members, 2, 3 and 5, are preferably formed of light structural shape, such as may be made from heavy gauge sheet metal. Preferably they are of channel section set edgewise. The members 2 and 3 have key slots 7 therein to fit over studs (not shown) set into the wall of the building, as will be well understood by those skilled in the art.

The frame is completed by two lower quadrants 8 and 9 and two upper quadrants 10 and 11. The curved or quarter-circle members 8 and 9 are of similar construction, and they form a semi-circle, joining the lowermost ends of the three sloping members 2, 3 and 5. The members 10 and 11 are similar to 8 and 9, but have a smaller radius of curvature and join the three sloping frame members intermediate the ends thereof. Looking down on the frame, these two sets of curved members provide concentric semicircles.

Figure 3:
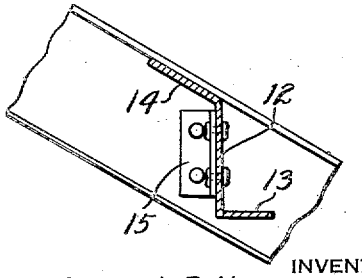
Fig. 3 is a typical section, such as one taken on line III—III of Fig. 2, showing one of six like joints in the assembly.
Figure 5:
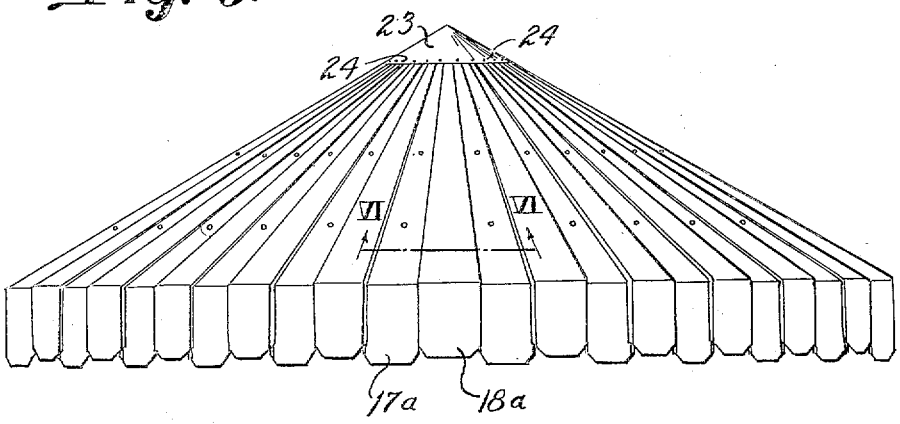
Fig. 5 is a front elevation of the canopy.
Figure 6:
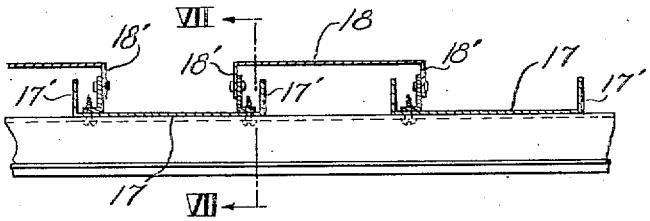
Fig. 6 is a transverse vertical section in the plane of line VI—VI of Fig. 5.

Each of the curved frame members is preferably of the section shown in Fig. 3, being a structural section of generally Z form of a shape such as can be made from heavy gauge sheet metal. The section so formed has a vertical web 12, an angular bottom flange 13, and a sloped upper flange 14. The curved members are secured to the sloped frame members by means of angle elements or cleats 15, which are riveted to the sloping frame members and to the vertical portions 12 of the curved members. There is a joint similar to that shown in Fig. 3 at each end of each curved member, so that there are eight such joints in all.

The flanges 14 of each of the curved members are provided with regularly-spaced notches 16 opening downwardly from the upper edge of the flange 14, these notches being clearly shown in Figs. 1 and 2. The ones along the upper or inner curved members are spaced more closely than the ones in the outer or lower curved members, and these notches are for the purpose hereinafter described.

The cover of the canopy is comprised of sheet metal channels 17 and 18, the channels 17 having inwardly-turned flanges, and the channels 18 having downwardly-turned flanges, the flanges being designated 17′ and 18′ respectively. These channels 17 and 18 decrease in width from the bottom toward the top. Each is provided with a vertically-turned valance portion, the valance portions for the channels 17 being designated 17a, and those for the channels 18 being designated 18a. Because of their taper, all of the channels converge toward the apex 4 of the frame.

Figure 7:
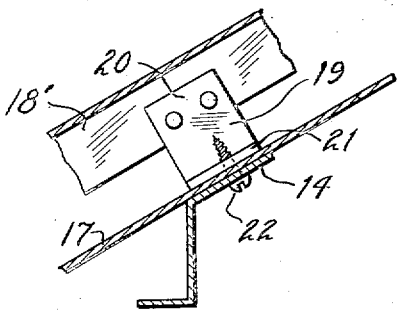
Fig. 7 is a similar section in the plane of line VII—VII of Fig. 6.

The channels 17 are spaced from one another, and the channels 18 are in staggered relation to the channels 17, so as to form a covering for this space. The depending flanges 18′ overlap, but are spaced from the upstanding flanges 17′, leaving a passageway for the circulation of air through the space between the channels 17 and out between these flanges. At the same time the flanges overlap sufficiently to exclude all direct rays of the sun, even when the sun is at a very low angle, and the channels also exclude the wind-driven rain. Additionally, the flanges 17' prevent rain which is flowing down the channels from escaping laterally into the spaces between the channels. The channels 18 are supported in the above described relation to the channels 17 by means of cleats 19 having an upstanding leg 20 riveted to the flange 18' and a horizontal base 21 which rests on the bottom of the channel 17. These cleats are so spaced at two points along each of the louvres or channels, that in the assembly they will be positioned directly over the flange 14 of the curved sections as is clearly shown in Fig. 7. The cleats 19 are held in place by sheet metal screws 22 that are received in the slots 16, pass through openings formed in the bottoms of the channels 17, and pass through the openings in the base portions 21 of the cleats 19. The slots 16 in the curved frame members therefore serve to receive the shanks of the sheet metal screws 22, while the heads of the screws, being of a diameter greater than the width of the slots, lap under the flanges 14 and prevent relative vertical movement of the screws and the parts attached to the screws. The base portions 21 must be pulled down tight enough against the bottoms of the louvres or channels 17 to prevent rattling or looseness of the upper louvres, and tight enough to hold the lower channels or louvres 17 against the flanges 14 of the curved supports. By having the screws 22 in non-threaded engagement with the flanges 14, i. e., by having them in the openings 16, the sheet metal screws will draw the parts together, whereas if the screws were threaded through three thicknesses of metal, the parts might not be uniformly pulled together into tight relation, one part binding against another. Also this arrangement enables the screws to be temporarily inserted to hold the lower louvres in place, after which the upper louvres may be applied. It will be noted that the weight of the parts is such that they naturally tend to slide downwardly, so that there is no danger of the screws 22 slipping out of the notches or slots 16.

The upper ends of the louvres terminate short of the apex 4 of the frame, and a half conical cap piece 23 is fitted over the upper ends of the louvres and secured thereto by means of sheet metal screws 24, or other fastening means. Cap piece 23 adds an ornamental and finished appearance to the canopy, as well as serving to effectively close the opening which would otherwise exist, due to the fact that it is impractical to carry all of the converging louvres up to a sharp point.

Figure 4:
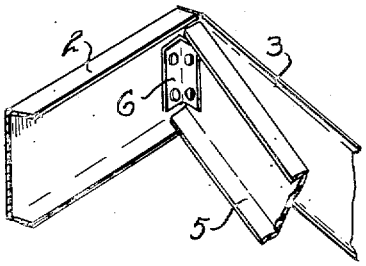
Fig. 4 is a perspective view of the peak or top center of the frame.

In use, the frame shown in Figs. 1 and 2 is first assembled. Normally this is done at the sheet metal shop where the canopy is produced, but the parts may be shipped in a knocked-down condition and assembled in the field, in which cases sheet metal screws or bolts and nuts may be employed in making the joints shown in Figs. 3 and 4 instead of the rivets as shown.

When the frame is assembled, anchoring studs are positioned in the wall of the building on which the canopy is to be hung in proper position to engage the key slots 7. The frame without the covering is then hung on the building and caulking may be applied against the wall of the building where the wall-engaging frame members 2 and 3 lie against the base of the building. This caulking serves to deflect any water that may run down the face of the building. Thereafter the louvres are applied in a manner previously indicated, and finally the cap piece 23 is secured in place and additional caulking may be put along the face of the building and the edges of the cap piece 23 where they contact the building.

Our canopy as thus constructed is of novel appearance. It is architecturally compatible with the doorways of most buildings. It is relatively light aluminum, preferably being used throughout. Other materials, including plastics, may be used in the construction of the frame or for the louvres. The louvres can be secured in place firmly and quickly without the use of tools after the frame is erected. As a matter of fact, it is not difficult for the home owner to purchase the canopy in knocked-down form and install it himself.

While we have illustrated and described a certain specific embodiment of our invention, it will be understood that various changes and modifications may be made in the detailed construction and arrangement of parts, all within the contemplation of our invention.

We claim:

1. In a canopy construction, a pair of upwardly-converging frame members in a common plane adapted to be placed against the wall of a building, a third frame member at right angles to the first two and sloping downwardly and forwardly from the juncture of the first two, and curved quadrants at different levels connecting said third frame member with each of the first two, and upwardly converging, alternately-turned overlapping channel-shaped louvres secured to said quadrants.

2. In a canopy construction, a frame structure comprising an inverted V-shaped frame adapted to be placed against the wall of a building, a projecting frame member sloping downwardly and forwardly from the apex of the V-shaped frame and at right angles thereto, curved quadrants of structural shape extending from said last-named frame member to each of the legs of the inverted V-shaped frame member, said quadrants being located at different levels and being of different radii, the lowermost ones being attached to the lowermost ends of the V-shaped frame, the other being intermediate the ends of the V-shaped frame and the apex thereof and louvres of upwardly and inwardly tapering width supported on and secured to said quadrants.

3. In a canopy construction, a frame structure comprising an inverted V-shaped frame adapted to be placed against the wall of a building with the two legs of the V-shaped frame sloping downwardly at equal angles from the apex, a projecting frame member sloping downwardly and forwardly from the apex of the V-shaped frame and at right angles thereto, curved quadrants of structural shape extending from said last-named frame member to each of the legs of the inverted V-shaped frame member, and louvres of upwardly and inwardly tapering width supported on and secured to said quadrants, said louvres being comprised of alternately reversed channels having overlapping flanges in spaced relation, said quadrants having flanged portions, the slope of which corresponds substantially to the slope of the legs of the inverted V, the upper edges of the flanges having downwardly-extending notches formed thereon, and headed fasteners having shanks received in the notches and engaged with the louvres above the quadrants, the heads of the fasteners bearing against the quadrants adjacent the under face of the notched areas thereof.

4. In a canopy construction, a frame structure comprising an inverted V-shaped frame adapted to be placed against the wall of a building with the two legs of the V-shaped frame sloping downwardly at equal angles from the apex, a projecting frame member sloping downwardly and forwardly from the apex of the V-shaped frame and at right angles thereto, curved quadrants of structural shape extending from said last-named frame member to each of the legs of the inverted V-shaped frame member, and louvres of upwardly and inwardly tapering width supported on and secured to said quadrants, said louvres being comprised of alternately reversed channels having overlapping flanges in spaced relation, said quadrants having flanged portions, the slope of which corresponds substantially to the slope of the legs of the inverted V, the upper edges of the flanges having downwardly-extending notches formed therein, the channels with upwardly-extending flanges resting on the quadrants and the ones with downwardly-turned flanges having cleats thereon to engage the bottoms of the flanges with upwardly-turned flanges, there being metal sheet screws entered in said notches in passing through the bottoms of the louvres with upwardly-turned flanges and engaged in said cleats on the channels with downwardly-turned flanges.

5. In a canopy construction, a frame comprising a pair of upwardly converging frame elements connected together at their point of convergence, said elements being located in a common vertical plane, curved structural members providing semi-circular supports at spaced horizontal levels which, respectively, have their ends connected to said elements at spaced points, and a supporting member in a plane at right angles to said vertical plane and sloping downwardly from said point of convergence, said supporting member having its upper end connected to at least one of said frame elements and having connections with the center of each of said semi-circular supports to provide a support therefor, and upwardly converging louvres secured to the semi-circular supports, the semi-circular supports transmitting the weight of the louvres to said upwardly converging frame elements, thereby providing a rigid unit that may be secured to the surface of a vertical wall and project downwardly and outwardly therefrom.

*6. A metal canopy construction comprising an inverted V-shaped frame constructed to rest against a flat wall of a building, a series of semi-circular supports arranged at different levels extending from one leg of the V-shaped frame to the other leg of the frame and secured to the frame at each end, and a canopy covering the semi-circular supports comprising a series of upwardly-converging alternately-turned overlapping lower and upper channel-shaped louvres both attached to the semi-circular supports with cleats.*

*7. The canopy defined in claim 6 in which the louvres consist of upper and lower sets of upwardly and inwardly-tapered channel members, the lower set of channels having upwardly-extending side flanges and resting in spaced relation upon and secured to the semi-circular supports, and the upper set of channels covering the spaces between the lower channels with downwardly-projecting flanges located within the lower channels, said upper channels being secured to the lower channels.*

*8. The canopy defined in claim 6 in which the louvres form a half-cone shaped cover with the upper ends of the louvres terminating short of the cone apex, and a top cap is attached to the louvres to cover the upper ends of the louvres.*

SAMUEL B. KORMAN.
MEYER HARRISON.

References Cited in the file of this patent or the original patent

UNITED STATES PATENTS

| Number | Name | Date |
|---|---|---|
| Re. 20,975 | Houseman | Jan. 10, 1939 |
| 977,565 | Smith | Dec. 6, 1910 |
| 1,114,639 | Oberer | Oct. 20, 1914 |
| 2,112,348 | Rutten | Mar. 29, 1938 |
| 2,154,394 | Clark | Apr. 11, 1939 |
| 2,577,317 | Eschrich | Dec. 4, 1951 |